United States Patent
Sun et al.

(10) Patent No.: US 11,689,452 B2
(45) Date of Patent: Jun. 27, 2023

(54) METHOD FOR FORWARDING SERVICE DATA, NETWORK DEVICE, AND NETWORK SYSTEM

(71) Applicant: ZTE Corporation, Shenzhen (CN)

(72) Inventors: Jinsong Sun, Shenzhen (CN); Shaofu Peng, Shenzhen (CN); Huilai Wang, Shenzhen (CN)

(73) Assignee: ZTE CORPORATION, Shenzen (CN)

( * ) Notice: Subject to any disclaimer, the term of this patent is extended or adjusted under 35 U.S.C. 154(b) by 0 days.

(21) Appl. No.: 17/299,021

(22) PCT Filed: Aug. 29, 2019

(86) PCT No.: PCT/CN2019/103177
§ 371 (c)(1),
(2) Date: Jun. 2, 2021

(87) PCT Pub. No.: WO2020/134139
PCT Pub. Date: Jul. 2, 2020

(65) Prior Publication Data
US 2022/0045944 A1 Feb. 10, 2022

(30) Foreign Application Priority Data
Dec. 29, 2018 (CN) .......................... 201811648145.7

(51) Int. Cl.
*H04L 45/50* (2022.01)
*H04L 45/122* (2022.01)
(Continued)

(52) U.S. Cl.
CPC ............ *H04L 45/50* (2013.01); *H04L 45/122* (2013.01); *H04L 45/20* (2013.01); *H04L 45/32* (2013.01); *H04L 45/66* (2013.01); *H04L 45/745* (2013.01)

(58) Field of Classification Search
CPC ....... H04L 45/00; H04L 47/70; H04L 47/724; H04L 45/02; H04L 45/50; H04L 45/28;
(Continued)

(56) References Cited

U.S. PATENT DOCUMENTS 9,363,141 B1 * 6/2016 Buckley .............. H04L 41/0893
9,461,877 B1 * 10/2016 Nadeau ................ H04Q 3/0062
(Continued)

FOREIGN PATENT DOCUMENTS

CN       103650437 A      3/2014
CN       107277883 A     10/2017
(Continued)

OTHER PUBLICATIONS

International Search Report for corresponding application PCT/CN2019/103177 filed Aug. 29, 2019; dated Dec. 3, 2019.
(Continued)

*Primary Examiner* — Djenane M Bayard
(74) *Attorney, Agent, or Firm* — Cantor Colburn LLP (57) ABSTRACT

Provided is a method for forwarding service data, a network device, and a network system. The forwarding method may include the following operation. A forwarding path for service data is determined according to network resource configuration information of a designated network and a network slice of the service data, wherein the network resource configuration information indicates one or more network slices associated with one or more network resources of the designated network, and a network slice associated with a network resource of the determined forwarding path matches the network slice of the service data; and the service data is forwarded according to the forwarding path.

14 Claims, 5 Drawing Sheets

(51) Int. Cl.
H04L 45/00 (2022.01)
H04L 45/745 (2022.01)

(58) Field of Classification Search
CPC ......... H04L 45/22; H04L 9/40; H04L 45/302; H04L 47/10; H04L 65/80; H04L 47/822; H04L 1/1671; H04L 65/1069; H04L 61/00; H04L 45/48; H04L 5/0053; H04L 41/40; H04L 5/0048; H04L 41/0895; H04L 5/001; H04L 41/0806; H04L 41/0893; H04L 41/0896; H04L 5/0094; H04L 41/12; H04L 5/0051; H04L 41/5051; H04L 41/122; H04L 5/0055; H04L 5/0098; H04L 41/5054; H04L 5/0023; H04L 1/1819; H04L 41/0897; H04L 5/0007; H04L 1/1896; H04L 5/0092; H04L 5/0044; H04L 1/1812; H04L 1/1822; H04L 41/0816; H04L 1/1854; H04L 41/044; H04L 45/64; H04L 41/5025; H04L 41/0803; H04L 41/5019; H04L 1/1864; H04L 5/0091; H04L 67/10; H04L 12/4641; H04L 43/08; H04L 1/08; H04L 1/1887; H04L 41/5006; H04L 41/0813; H04L 5/0035; H04L 67/12; H04L 41/5045; H04L 43/20; H04L 5/0057; H04L 5/0064; H04L 1/0026; H04L 1/189; H04L 41/147; H04L 43/0882; H04L 67/141; H04L 27/0006; H04L 41/5009; H04L 43/0852; H04L 45/12; H04L 45/121; H04L 45/122; H04L 45/20; H04L 45/32; H04L 45/66; H04L 45/745; H04L 47/215; H04L 47/24; H04L 47/2441; H04L 47/30; H04L 47/56; H04L 49/70; H04L 5/003; H04L 5/0058; H04L 5/14; H04L 63/0876; H04L 63/1433; H04L 63/162; H04L 65/61; H04L 65/752; H04L 65/765; H04L 67/1001; H04L 67/289; H04L 67/55; H04L 67/56; H04L 67/566; H04L 67/568; H04L 67/5681; H04L 67/59; H04L 69/14; H04L 69/22; H04L 69/24; H04L 69/40; H04W 24/08; H04W 28/10; H04W 4/70; H04W 16/10; H04W 24/02; H04W 28/0247; H04W 28/0268; H04W 4/50; H04W 40/04; H04W 72/52; H04W 12/06; H04W 4/44; H04W 56/001; H04W 60/04; H04W 12/02; H04W 12/069; H04W 12/08; H04W 12/108; H04W 12/12; H04W 12/61; H04W 12/63; H04W 24/10; H04W 28/0231; H04W 28/0273; H04W 28/08; H04W 28/18; H04W 4/24; H04W 4/40; H04W 4/90; H04W 40/248; H04W 48/16; H04W 48/18; H04W 52/00; H04W 52/243; H04W 52/367; H04W 52/42; H04W 56/0035; H04W 60/00; H04W 64/00; H04W 76/10; H04W 8/20; H04W 8/22; H04W 8/24; H04W 8/26; H04W 88/06; H04W 88/16

See application file for complete search history.

(56) References Cited

U.S. PATENT DOCUMENTS

| | | | |
|---|---|---|---|
| 2008/0008202 A1* | 1/2008 | Terrell | H04L 45/586 370/401 |
| 2013/0308945 A1 | 11/2013 | Dhillon | |
| 2016/0353367 A1 | 12/2016 | Vrzic | |
| 2017/0054595 A1* | 2/2017 | Zhang | H04L 41/0896 |
| 2017/0257870 A1* | 9/2017 | Farmanbar | H04W 40/04 |
| 2018/0041994 A1* | 2/2018 | Zhang | H04W 12/06 |

FOREIGN PATENT DOCUMENTS

| | | |
|---|---|---|
| CN | 107517488 A | 12/2017 |
| CN | 107889169 A | 4/2018 |
| CN | 108494474 A | 9/2018 |

OTHER PUBLICATIONS

ETSI GR NGP 011 V1.1.1. (Sep. 2018), "Next Generation Protocols (NGP); F2E Network Slicing Reference Framework and Information Model", pp. 1-32.

* cited by examiner

Is-Is Slice LAN-Adj-SID sub-TLV

Fig. 9

OSPF Slice Prefix-SID sub-TLV

Fig. 10

OSPF Slice Extended Prefix Range TLV

Fig. 11

OSPF Slice Adj-SID TLV

Fig. 12

OSPF Slice LAN Adj-SID TLV

Fig. 13

METHOD FOR FORWARDING SERVICE DATA, NETWORK DEVICE, AND NETWORK SYSTEM

CROSS-REFERENCE TO RELATED APPLICATIONS

This application claims priority to Chinese patent application No. 201811648145.7, filed before the China National Intellectual Property Administration (CNIPA) on Dec. 29, 2018 and entitled "Method for Forwarding Service Data, Network Device, and Network system", the content of which is hereby incorporated by reference in its entirety.

TECHNICAL FIELD

The present application relates to the field of communications, in particular to a method for forwarding service data, a network device, and a network system.

BACKGROUND

Network slicing is one of the key technologies of the 5th Generation mobile network (5G), the purpose of which is to provide a customized and isolated end-to-end private network with reliable quality on a bearer network. The technology can be used to segment multiple virtual networks on the same network infrastructure, so that the traffic of different services can be logically isolated on network resources during transmission, thereby meeting characteristic requirements of different types of services. However, there is no solution that enables the forwarding of network slice service data in the bearer network.

SUMMARY

The present application provides a method for forwarding service data, a network device, and a network system to at least solve the problem in the related art that network slice service data cannot be forwarded in a bearer network.

According to an embodiment of the present application, a method for forwarding service data in a designated network is provided. The method may include the following operation. A network device determines a forwarding path for the service data according to network resource configuration information of the designated network and a network slice of the service data, wherein the network resource configuration information indicates one or more network slices associated with one or more network resources of the designated network, and a network slice associated with a network resource of the determined forwarding path matches the network slice of the service data; and the network device forwards the service data according to the forwarding path.

According to another embodiment of the present application, a network device is provided, which includes a memory and a processor. The memory stores a computer program. The processor is configured to run the computer program to perform the following operations. A forwarding path for service data is determined according to network resource configuration information of a designated network and a network slice of the service data, wherein the network resource configuration information indicates one or more network slices associated with one or more network resources of the designated network, and a network slice associated with a network resource of the determined forwarding path matches the network slice of the service data; and the service data is forwarded according to the forwarding path.

According to yet another embodiment of the present application, a network system is also provided, which includes the above network device.

According to yet another embodiment of the present application, a storage medium is also provided. The storage medium stores a computer program. The computer program is configured to perform operations in any of the above method embodiments at runtime.

Through the embodiments of the present application, the network device can determine the forwarding path for the service data according to the network resource configuration information of the designated network and the network slice of the service data, wherein the network resource configuration information indicates one or more network slices associated with one or more network resources of the designated network, and a network slice associated with a network resource of the determined forwarding path matches the network slice of the service data; and the network device forwards the service data according to the forwarding path. Therefore, the problem in the related art that network slice service data cannot be forwarded in a bearer network can be solved, and different pieces of service data can be forwarded according to their corresponding network slice resources.

BRIEF DESCRIPTION OF THE DRAWINGS

The accompanying drawings described herein are used to provide a deeper understanding of the present disclosure, and constitute a part of the present application. The exemplary embodiments of the present disclosure and the description thereof are used to explain the present disclosure. The drawings and the exemplary embodiment do not constitute limitations to the present disclosure. In the drawings.

DETAILED DESCRIPTION OF THE EMBODIMENTS

The present disclosure is described below with reference to the drawings and in conjunction with the embodiments in detail. It is to be noted that embodiments in the present application and characteristics in the embodiments may be combined to derive other embodiments not explicitly described.

It is to be noted that the terms "first", "second" and the like in the specification and claims of the present disclosure and the drawings are used to distinguish similar objects, and are not used to describe a specific sequence or a precedence order.

Embodiment 1

Figure 1:
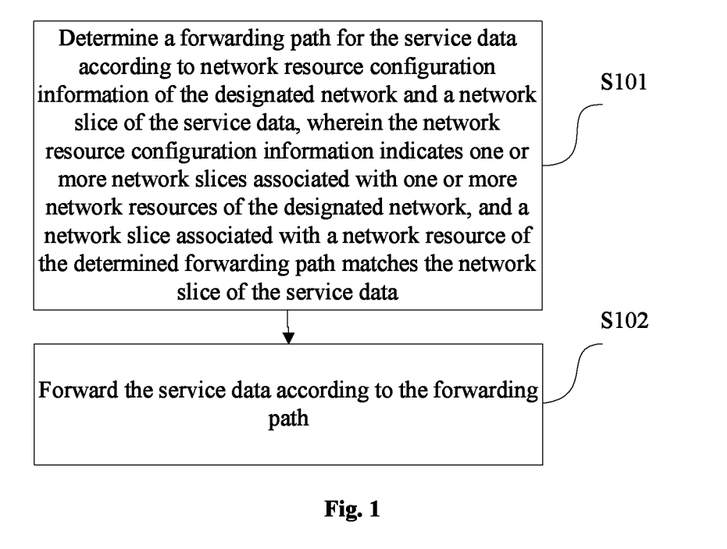
FIG. 1 is a flowchart of a method for forwarding service data according to an embodiment of the present application.

An embodiment of the present application provides a method for forwarding service data in a designated network. FIG. 1 is a flowchart of a method for forwarding service data according to an embodiment of the present application. As shown in FIG. 1, the method includes the following operations.

At S101, a network device determines a forwarding path for the service data according to the network resource configuration information of the designated network and a network slice of the service data, wherein the network resource configuration information indicates one or more network slices associated with one or more network resources of the designated network, and a network slice associated with a network resource of the determined forwarding path matches the network slice of the service data.

At S103, the network device forwards the service data according to the forwarding path.

Through the embodiments of the present application, the forwarding path for the service data can be determined according to the network resource configuration information of the designated network and the network slice of the service data, wherein the network resource configuration information indicates one or more network slices associated with one or more network resources of the designated network, and a network slice associated with a network resource of the determined forwarding path matches the network slice of the service data; and the service data can be forwarded according to the forwarding path. Therefore, the problem in the related art that network slice service data cannot be forwarded in a bearer network can be solved, and different pieces of service data can be forwarded according to their corresponding network slice resources.

In an implementation mode, the operation that the forwarding path for the service data is determined according to the network resource configuration information of the designated network and the network slice of the service data may include the following operation. The forwarding path for the service data is determined according to link resource configuration information. The network slice associated with each link on the determined forwarding path is the same as the network slice of the service data. The network resource configuration information includes the link resource configuration information. The link resource configuration information indicates one or more network slices associated with one or more links in the designated network.

In an implementation mode, the operation that the network device determines the forwarding path for the service data according to the link resource configuration information may include the following operation. A next hop link of the service data is determined according to the link resource configuration information; or, the forwarding path for forwarding the service data to a destination node is determined according to the link resource configuration information based on a preset algorithm. The forwarding path includes multiple links.

In an implementation mode, the operation that the network device determines the forwarding path for the service data according to the network resource configuration information of the designated network and the network slice of the service data may further include the following operation. A member interface of the link for forwarding the service data on the forwarding path is determined according to link member interface configuration information. A network slice associated with the member interface of the link for forwarding the service data is the same as the network slice of the service data. The link resource configuration information includes the link member interface configuration information. The link member interface configuration information indicates one or more network slices associated with one or more member interfaces of one or more links in the designated network.

In an implementation mode, the operation that the network device determines the forwarding path for the service data according to the network resource configuration information of the designated network and the network slice of the service data may further include the following operation. The forwarding path for the service data is determined according to network node resource configuration information. A network slice associated with each network node on the determined forwarding path is the same as the network slice of the service data. The network resource configuration information includes the network node configuration information. The network node configuration information indicates one or more network slices associated with one or more network nodes in the designated network.

In an implementation mode, the operation that the network device forwards the service data according to the forwarding path may include the following operations. Information of the forwarding path is encapsulated on the service data. The service data is forwarded according to the encapsulated information of the forwarding path.

In an implementation mode, before the network device determines the forwarding path for the service data according to the network resource configuration information of the designated network and the network slice of the service data, the method may include the following operations. The network resource configuration information is received. The network resource configuration information is notified to the network node in the designated network.

In an implementation mode, the network resource configuration information includes one or more network slice identities associated with one or more network resources of the designated network.

Through the description of the above implementations, those having ordinary skill in the art can understand that the method according to the above embodiment may be implemented by means of software plus a necessary general hardware platform, and of course, may also be implemented through hardware. However, in many cases, the former is a better implementation. Based on such understanding, the essence of technical solution of the embodiments of the present disclosure, or in other words, the part of the technical solutions making contributions to the conventional art, may be embodied in the form of a software product stored in a storage medium (such as a Read-Only Memory (ROM)/Random Access Memory (RAM), a magnetic disk and an optical disc), including a number of instructions for enabling a terminal device (which may be a mobile phone, a computer, a server, or a network device, etc.) to perform the methods described in various embodiments of the present disclosure.

The embodiments of the present application are further elaborated in combination with the following specific implementation modes.

In the embodiments of the present application, network resources of a device can be sliced and identified. The network resources include, but are not limited to, prefix addresses of the device, layer 3 links, layer 2 member interfaces, Central Processing Units (CPUs) and forwarding queues. In order to enable the forwarding of different service traffics according to their corresponding slice resources, it is needed to perform path calculation based on different slice resources, and establish an association relationship between the forwarding of service traffic and the slice resources of a bearer network device.

In an exemplary implementation mode, different network slices are identified with different Slice-IDs. Slice-ID is a global concept in a network, and all devices in the same network have the same recognition for the same Slice-ID. The network resources with the same Slice-ID correspond to the same network slice, and the network resources with different Slice-IDs correspond to different network slices. The same network resource may be assigned with different Slice-IDs to identify that the network resource belongs to the different network slices. An associated Slice-ID of a service may be used for identifying the corresponding network slice, and the traffic will be forwarded in the corresponding network resource.

In an implementation mode, a slicing scheme for a Multi-Protocol Label Switching (MPLS) network is considered. An Internet Content Provider (IGP) protocol is responsible for flooding network resource information associated with the Slice-ID in the entire network. An ingress Provider Edge (PE) device collects the flooded information, calculates path forwarding information corresponding to the service based on the different Slice-ID network resources and according to an algorithm specified by the service, for example, Shortest Path First (SPF) or Constrained Shortest Path First (CSPF) of various strategies, iterates underlying network resources needed by associated forwarding, and finally generates a device forwarding table entry. When receiving the service traffic, an ingress PE device needs to encapsulate a corresponding MPLS label into the service traffic according to slice information associated with the service and forwards the service traffic. Similar to the ingress PE device, a P device also generates a forwarding table entry differentiating the services, maps to the corresponding underlying network resources according to the MPLS label, and performs a label Swap operation until a message reaches an egress PE.

In an exemplary implementation mode, the service data may carry the identity used for identifying the network slice associated with the service data. The identity may be an identity that directly identifies the network slice to which the service data belongs, for example, the Slice-ID, or any other identity that can indirectly identify the network slice to which the service data belongs, for example, classification information of the service data.

In an exemplary implementation mode, the PE in the network for forwarding the service data may map the service data to a specific network slice, for example, in the following two mapping modes: coarse-grained mapping and fine-grained mapping. In the coarse-grained mapping mode, if Slice-ID information is configured under a Virtual Routing Forwarding (VRF) service instance, all data messages belonging to the VRF service instance can be forwarded through the network slice corresponding to the corresponding Slice-ID. In the fine-grained mapping mode, a strategy may be configured to map service messages to different network slices according to traffic classification information of the service messages (such as a source/target Media Access Control (MAC) address, a source/target Internet Protocol (IP) address, a source/target interface, and IP priority).

In an exemplary implementation mode, in order to realize the network slice based on the Slice-ID, the IGP protocol on the device needs to support associating the prefix and the layer 3 link with the corresponding Slice-ID, that is, assign one or more than one Slice-ID to the prefix and the layer 3 link. In addition, in certain network application scenarios, it may also be necessary to use member interface information of the layer 3 links (such as a Flexible Ethernet (FlexE) and Link Aggregation (LAG)), so the device should also support assigning the corresponding Slice-ID to the layer 2 member interfaces of these layer 3 links. When an Interior Gateway Protocol (IGP) notifies the topology resource information, the associated Slice-ID information will also be notified, so as to identify the network slice information corresponding to the topology resource information.

In an exemplary implementation mode, the slicing of the MPLS network may be realized based on a Segment Routing (SR) technology. The SR technology is a kind of source routing technology, which uses SID to define network topology and service, and can identify path information for service message forwarding by adding a SID List identifier in front of the service message, thereby flexibly controlling the forwarding of the service traffic. In the SR MPLS network, the device may assign the corresponding SID to the prefix, the layer 3 link and the layer 2 member interface. The SID assigned to the prefix is called Prefix-SID, the SID assigned to the adjacency of the device is called Adj-SID, and the Adj-SID for identifying assigned to the layer 2 member interface of the layer 3 link is called L2 Bundle Member Adj-SID.

In an exemplary implementation mode, the original SR SID may be extended, so that different slice SIDs can be assigned based on different Slice-IDs. After the slice SIDs are assigned to SR resources based on the Slice-IDs, the corresponding information will be flooded through the IGP in the entire routing domain.

In an exemplary implementation mode, other devices on the network receive topology information carrying a Slice-ID field of the above notification, and use service associated algorithm to calculate corresponding SR MPLS label path forwarding information based on slice network resources of these devices, thus providing a basis for flexibly specifying the forwarding of different services in different logical topologies.

In an exemplary implementation mode, the device may respectively specify SIDs for the prefixes, the layer 3 links and the layer 2 member interfaces based on different Slice-IDs, and the SIDs can be used for SR resource identification in different network slices.

In an exemplary implementation mode, each SID is uniquely associated with one Slice-ID. The Prefix-SID, the Adj-SID and the L2 Bundle Member Adj-SID with the same Slice-ID belong to the same network slice. The assigned SID and the Slice-ID information corresponding to the assigned SID will be issued to a local label forwarding table of the device. An Incoming Label Map (ILM) table entry is established for associating the service with local hardware resources, and guiding local forwarding of the service traffic.

In an exemplary implementation mode, when no Slice-ID is assigned to the above network resource, it is deemed that the network resource is located in a default slice. In such a case, the prefix, the layer 3 link, the layer 2 member interface and the SID specified for the prefix, the layer 3 link and the layer 2 member interface do not have their corresponding Slice-IDs, or have a Slice-ID of 0.

In an exemplary implementation mode, a Prefix-SID notification mode is added in the IGP protocol, Slice-ID information is introduced in the corresponding notification mode, and the Slice-ID information is flooded on the network along with the Prefix-SID. For the IS-IS protocol, when route reassignment or route leaking operation is performed, it is necessary to support an inherited Slice-ID to be processed with the Prefix-SID information. For the OSPF protocol, when route reassignment or area route summary is performed, it is also necessary to support the inherited Slice-ID to be processed with the Prefix-SID information.

In an exemplary implementation mode, when the device, serving as a mapping server, notifies the Prefix-SID of a group or multiple groups of prefixes, an SRMS information notification mode will be added in the IGP protocol, Slice-ID information will be introduced in the corresponding notification mode, and the Slice-ID information will be flooded on the network along with the SRMS information.

In an exemplary implementation mode, a notification mode supporting the Adj-SID of the layer 3 link is added in the IGP protocol, Slice-ID information is introduced in the corresponding notification mode, and the Slice-ID information is flooded on the network along with the Adj-SID of the layer 3 link.

In an exemplary implementation mode, a notification mode supporting the L2 Bundle Member Adj-SID is added in the IGP, Slice-ID information is introduced in the corresponding notification mode, and the Slice-ID information is flooded on the network along with the L2 Bundle Member Adj-SID.

In an exemplary implementation mode, in order to consider compatibility with the original SID notification mode and prevent the device from parsing the SID information wrongly, it may be considered to define a new TLV for carrying the SID containing the Slice-ID information, so as to distinguish from the SID notification mode defined in the current protocol.

In an exemplary implementation mode, the IGP supports receiving and processing of all above related topology resource information, and saving the topology resource information in a topology information base for path calculation. Associated Slice-ID for identifying the information of the desired network slice where the traffic is to be forwarded may be specified for different services. Different path calculation methods may be specified based on service characteristics. For example, path calculation may be performed according to SPF. As another example, CSPF path calculation may be performed according to a certain strategy based on a Traffic Engineering Database (TEDB), wherein such strategy may be, for example, forwarding along the path with the shortest latency or along the link with the maximum bandwidth.

In an exemplary implementation mode, the IGP performs topology path calculation based on the network slice supported by a local device, but does not perform topology calculation for the network slice not supported by the local device.

In an exemplary implementation mode, when path calculation is performed for a certain service in the corresponding network slice, only the topology resources with the same Slice-ID are used for calculation. If the Slice-ID information corresponding to the prefix or the link is different, then such topology resources cannot participate in the path calculation. When path calculation is performed, if the IGP notifies the member interface information of the layer 3 link, the relevant information may also participate in the path calculation under the premise that the relevant information has the same Slice-ID. When the IGP performs the SR-BE calculation, for the prefix notified by a remote device, after the path is calculated to be reachable for a certain network slice, in the issued SR MPLS label corresponding to a Forward Error Correction (FEC) of the prefix, an incoming label and an outgoing label adopt the Prefix-SID corresponding to the Slice-ID of the network slice, and the corresponding Slice-ID will also be notified to a forwarding plane as an issued field.

In an exemplary implementation mode, the IGP performs path calculation based on a certain network slice. For a certain reachable prefix, if a directly connected next hop is a layer 3 link including a layer 2 member interface, for example, if the directly connected next hop is a FlexE interface and a layer 2 member interface under the FlexE interface is associated with optional Slice-ID information, then a forwarding next hop may be optionally associated with the layer 2 member interface with the same Slice-ID.

In an exemplary implementation mode, when the IGP performs CSPF path calculation for a certain network slice based on the TEDB and iterates an optional SID List based on a calculated explicit path, the Prefix-SID for identifying the node, Adj-SID for identifying the link and L2 Bundle Member Adj-SID for identifying the layer 2 member interface should be the SID information corresponding to the network slice. The corresponding Slice-ID will be notified to the forwarding plane as the issued field.

The exemplary embodiments of the routing protocols are described below.

Exemplary Embodiment 1

Figure 3:
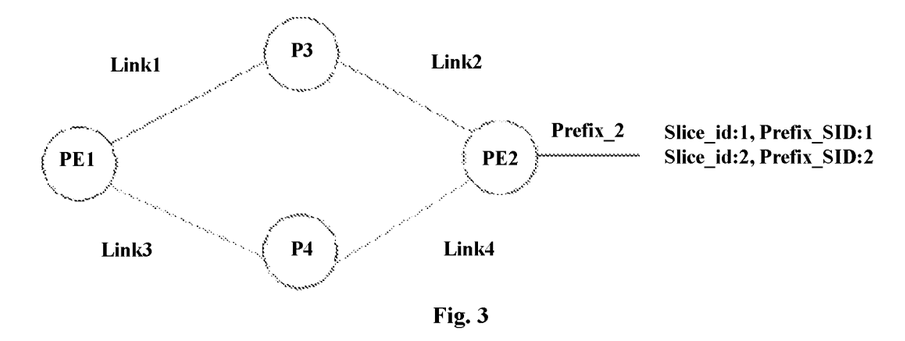
FIG. 3 is a schematic diagram that a routing protocol performs Segment Routing Best-effort LSP (SR-BE) path calculation based on a network slice according to an embodiment of the present application.

As shown in FIG. 3, the embodiment introduces an SR-BE calculation method when different layer 3 links on a network are associated with different network slices. In the SR MPLS network shown in FIG. 3, nodes PE1, PE2, P3 and P4 enable the IGP protocol and an SR function respectively. In the embodiment, all devices are equipped with the same SR Global Block (SRGB) with a range of [100,200]. Two Virtual Private Network (VPN) services are configured in the network, which are VPN_A and VPN_B respectively. In order to achieve the on-demand forwarding of different VPN services in different network slices, the following operations are suggested to be followed. In the embodiment, it is assumed that the two divided network slices correspond to Slice-ID 1 and Slice-ID 2 respectively.

At S1, the two VPN services are associated to the corresponding slices, for example, the VPN_A is associated with the Slice-ID1 and the VPN_B is associated with the Slice-ID 2. According to the configuration used in the present embodiment, the forwarding paths for the services VPN_A and VPN_B are calculated by the SR-BE method.

At S2, according to the configuration used in the present embodiment, the layer 3 links Link1 and Link2 belong to the slice 1 corresponding to the Slice-ID 1, and the layer 3 links Link3 and Link4 belong to the slice 2 corresponding to the Slice-ID 2. Two Prefix-SIDs respectively corresponding to the Slice-ID 1 and the Slice-ID 2, which are indexed by 1 or 2, are assigned to the prefix Prefix_2 notified by the P2 device. Two Information Lifecycle Management (ILM) table entries are created for the prefix Prefix_2 notified by the P2 device, which are respectively:

FEC:Prefix_2, Slice-ID:1, incoming label: 101,operation: POP

FEC:Prefix_2, Slice-ID:2, incoming label: 102,operation: POP.

At S3, the IGP protocol of the device on the network floods and forwards the configured link slice information and the Prefix-SID information of the different slices assigned to the prefix throughout the network. Optionally, the notification mode described in the embodiments below may be adopted.

At S4, after receiving the information flooded by the IGP, an ingress device PE1 saves the Slice-ID of the link of the PE1 and the different Prefix-SID information assigned to the prefix in the local topology database. The device supports two slices Slice-ID 1 and Slice-ID 2, so the PE1 tries to perform path calculation for the Slice-ID 1 and the Slice-ID 2. Since the path calculation method defined for the VPN1 and the VPN2 is the default SR-BE method, the device will perform the shortest path topology calculation based on the SPF. When the path calculation is performed for the Slice-ID 1, only the links with the Slice-ID being 1, namely the Link1 and the Link2, are adopted, and the forwarding path is calculated as PE1-P3-PE2. Similarly, when the path calculation is performed for the Slice-ID 2, only the links with the Slice-ID being 2, namely the Link3 and the Link4, are adopted, and the forwarding path is calculated as PE1-P4-PE2.

For the prefix Prefix_2, since the prefix Prefix_2 has different next hop forwarding information in different network slices, and is assigned with different Prefix-SIDs in different network slices, the slice forwarding information corresponding to the Prefix_2 needs to be issued to the forwarding table entry, as shown below:

FEC:Prefix_2, Slice-ID:1
Outgoing label: 101, next hop: Link1, operation: PUSH
FEC:Prefix_2, Slice-ID:2
Outgoing label: 102, next hop: Link3, operation: PUSH.

When the service traffic of VPN_A reaches the device PE1, the device PE1 iteratively looks up the forwarding table entry <FEC:Prefix_2,Slice-ID:1> according to configuration, encapsulates the MPLS label 101 into the traffic, associates the traditional underlay forwarding resource of the corresponding Slice-ID 1 with the traffic, and forwards the service traffic from the interface Link1. Similarly, when the service traffic of VPN_B reaches the device PE1, the device PE1 looks up the forwarding table entry <FEC: Prefix_2,Slice-ID:2> according to the configuration, encapsulates the MPLS label 102 into the traffic, associates the traditional underlay forwarding resource of the corresponding Slice-ID 2 with the traffic, and forwards the service traffic from the interface Link3.

At S5, the calculation operation similar to S4 is repeated on the P3 device. Since the P3 only supports the Slice-ID 1, the P3 device performs only the SR-BE path calculation based on the link of the Slice-ID 1, and the calculated SR label forward table entry is only based on the Slice-ID 1. The specific table entry is shown below.

FEC:Prefix_2, Slice-ID:1
Incoming label: 101, outgoing label: 101
Next hop: Link3
Operation: SWAP.

When the traffic encapsulated with the MPLS label 101 is forwarded to the device P3, the device P3 can find, by matching according to the incoming label 101, a forwarding table entry <FEC:Prefix_2,Slice-ID:2>, determine corresponding traditional underlay forwarding hardware resource, perform a label swap operation to swap the label into 101, and then forward the message from the interface Link3.

At S6, the operation on the P4 device is similar to S5, which will not be described in detail here.

Exemplary Embodiment 2

Figure 4:
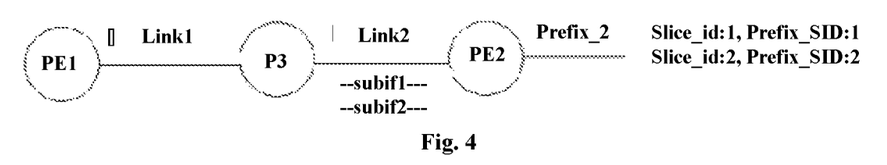
FIG. 4 is a schematic diagram that a routing protocol performs SR-BE path calculation based on a layer 2 member interface network slice according to an embodiment of the present application.

As shown in FIG. 4, the embodiment introduces the SR-BE calculation method when the layer 2 member interface of the layer 3 link on the network is associated with different network slices. In the SR MPLS network shown in FIG. 4, the configuration of the nodes PE1, PE2 and PE3 is the same as that in the exemplary embodiment 1. In the present exemplary embodiment, two network slices correspond to the Slice-ID 1 and the Slice-ID 2 respectively, and the Link1 and the Link2 belong to two network slices at the same time. The difference between the present exemplary embodiment and the exemplary embodiment 1 lies mainly in the SR-BE calculation method of the P3 device.

The P3 device configures that a layer 2 member interface subif1 in the layer 3 link Link2 belongs to the network slice identified by Slice-ID 1, while a layer 2 member interface subif2 in the layer 3 link Link2 belongs to the network slice identified by Slice-ID 2.

When calculating the SR-BE forwarding path based on the network slice identified by Slice-ID 1, the P3 device calculates according to the SPF to obtain the forwarding next hop, which is the Link2, of the prefix Prefix_2. Because the member interface subif1 of the Link2 belongs to the network slice identified by Slice-ID 1, the next hop actually used for forwarding is subif1. The forwarding table entry of SR-MPLS is as follows:

FEC:Prefix_2, Slice-ID:1
Incoming label: 101, outgoing label: 101
Next hop: subif1
Operation: SWAP.

Similarly, when the SR-BE forwarding path is calculated for the Prefix_2 based on the network slice identified by Slice-ID 2, because the member interface subif2 of the Link2 belongs to the network slice identified by Slice-ID 2, the next hop actually used for forwarding is subif2. The forwarding table entry of SR-MPLS is as follows:

FEC:Prefix_2, Slice-ID:2
Incoming label: 102, outgoing label: 102
Next hop: subif2
Operation: SWAP

Exemplary Embodiment 3

Figure 5:
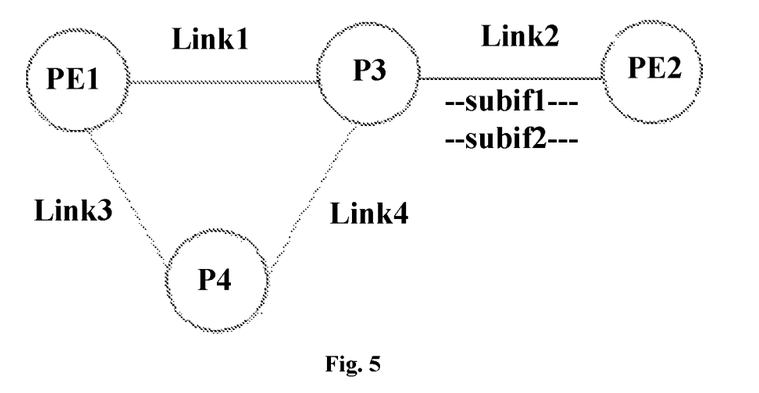
FIG. 5 is a schematic diagram that a routing protocol performs Segment Routing Traffic Engineering (SR-TE) path calculation based on a network slice according to an exemplary embodiment of the present application.

As shown in FIG. 5, the embodiment introduces the method for the device to perform the SR-TE path calculation base on different network slices. In the SR MPLS network shown in FIG. 5, the nodes PE1, PE2, PE3 and PE4 enable the IPG protocol and the SR function respectively. The network is divided into two network slices respectively corresponding to the Slice-ID 1 and the Slice-ID 2. In the embodiment, two VPN services VPN_A and VPN_B, which are associated with the Slice-ID 1 and the Slice-ID 2 respectively, are configured. According to the configuration used in the present embodiment, the forwarding paths for the services VPN_A and VPN_B are calculated by the CSPF method based on a certain strategy (for example, the shortest latency).

At S1, the layer 3 link Link1 is configured to belong to the slice 1 corresponding to the Slice-ID 1 and is assigned with an Adj-SID 1001; and the layer 3 links Link3 and Link4 are configured to belong to the slice 2 corresponding to the Slice-ID 2 and are assigned with Adj-SIDs 3002 and 4002 respectively. Under the layer 3 link Link2, there are two layer 2 member interfaces subif1 and subif2, which belong to the slice 1 and the slice2 respectively and are assigned with Adj-SIDs 2001 and 2002. The device creates an ILM table entry for each Adj-SID, which is as shown below:

Device PE1:
Incoming label: 1001, Slice-ID: 1, next hop: Link1, operation: POP
Incoming label: 3002, Slice-ID: 2, next hop: Link3, operation: POP Device P3:
Incoming label: 2001, Slice-ID: 1, next hop: subif1, operation: POP
Incoming label: 2002, Slice-ID: 2, next hop: subif2, operation: POP Device P4:
Incoming label: 4002, Slice-ID: 2, next hop: Link4, operation: POP At S2, the IGP protocol of the device on the network floods and forwards the configured link slice information and the Adj-SID information of the different slices throughout the network. Optionally, the notification mode described in the embodiments below may be adopted.

At S3, after receiving the information flooded by the IGP, the ingress device PE1 saves the Slice-ID of the link of the PE1 and the assigned different Adj-SID information in the local topology database. The device supports two slices Slice-ID 1 and Slice-ID 2, so the PE1 tries to perform path calculation for the Slice-ID 1 and the Slice-ID 2. Since the path calculation method defined for the VPN_A and the VPN_B is the SR-TE method, the device will perform the path calculation based on the CSPF. After calculation, the forwarding path of the VPN_A is PE1-Link1-P3-subif1-PE2, and the forwarding path of the VPN_B is PE1-Link3-P4-Link4-P3-subif2-PE2. The calculated path is iteratively converted to the corresponding SID List by using Adj-SID. The forwarding SID List A for the VPN_A is [1001, 2001], and the forwarding SID List B for the VPN_B is [3002, 4002, 2002].

At S4, when the service traffic of the VPN_A reaches the device PE1, the device PE1 iteratively looks up the forwarding table entry SID List A according to the configuration, encapsulates the corresponding SID List into the traffic and looks up the local ILM table entry according to the outermost label 1001, performs a POP operation to the outermost label, associates the traditional underlay forwarding resource according to the corresponding Slice-ID information, and forwards the message from the interface Link1 to the node P3. The P3 also looks up the local ILM table entry according to the outermost label of the traffic, determines the traditional underlay forwarding resource associated with the Slice-ID and completes the forwarding of the traffic until the traffic reaches the target node.

At S5, when the service traffic of the VPN_B reaches the device PE1, a flow similar to S4 is followed, which will not be described in detail here.

Figure 6:
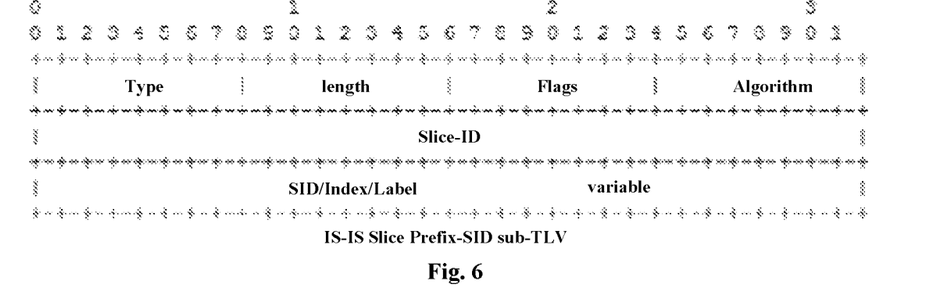
FIG. 6 is a format diagram of Prefix Segment Identifier (SID) sub-TLV carrying Slice-Identity Document (Slice-ID) information in an Intermediate System to Intermediate System (IS-IS) protocol according to an exemplary embodiment of the present application.

In the embodiments of the present application, an IS-IS protocol, considering device compatibility, adds a Slice Prefix-SID sub-TLV format based on the Prefix-ID notification mode of the Slice-ID. As shown in FIG. 6, the new Prefix-SID sub-TLV is added to achieve the notification of Slice-ID field information which is used to identify the Slice-ID information corresponding to the Prefix-SID.

Figure 7:
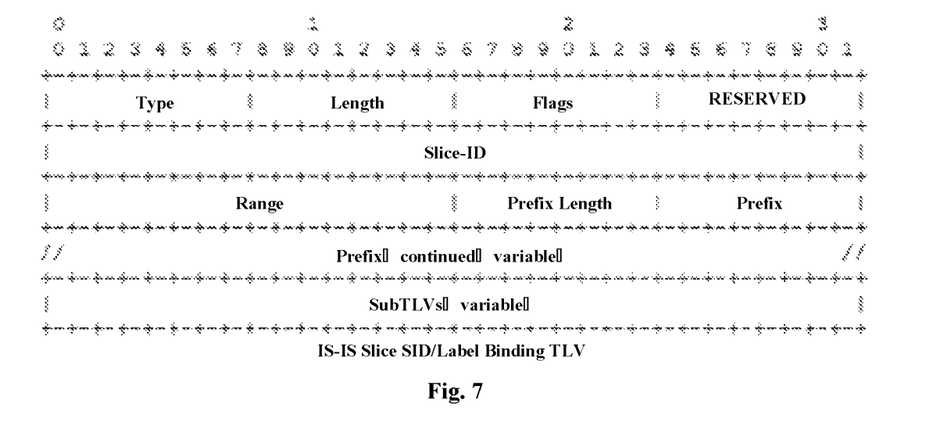
FIG. 7 is a format diagram of SID/Label Binding TLV carrying Slice-ID information in an IS-IS protocol according to an exemplary embodiment of the present application.

In the embodiments of the present application, an IS-IS protocol, considering device compatibility, adds a Slice SID/Label Binding TLV format based on a Slice-ID notification SID/Label Binding information mode. As shown in FIG. 7, compared with the SID/Label Binding TLV defined by the Internet Engineering Task Force (IETF), the Slice SID/Label Binding TLV is added to achieve the notification of a Slice-ID field which is used to identify the Slice-ID information corresponding to the Prefix-SID of a SID/Label Binding notification.

Figure 8:
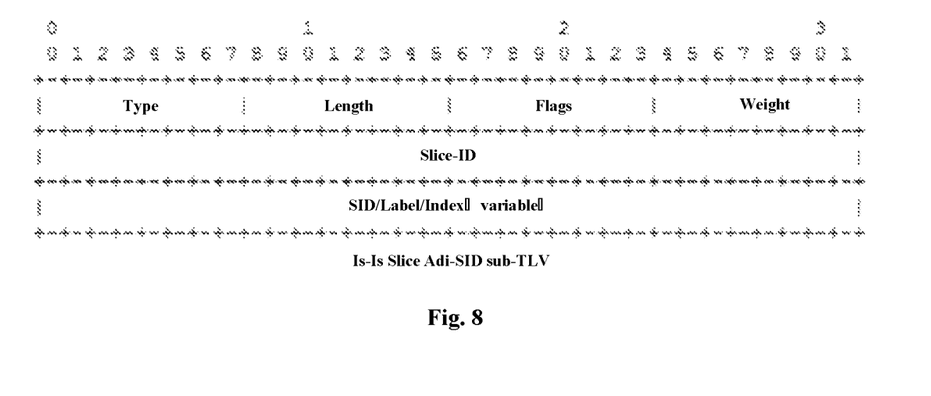
FIG. 8 is a format diagram of Adj-SID sub-TLV carrying Slice-ID information in an IS-IS protocol according to an exemplary embodiment of the present application.
Figure 9:
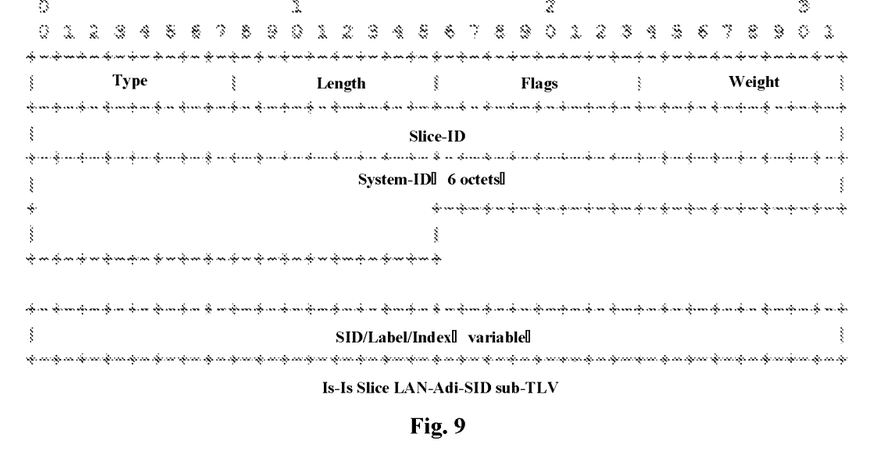
FIG. 9 is a format diagram of LAN-Adj-SID sub-TLV carrying Slice-ID information in an IS-IS protocol according to an exemplary embodiment of the present application.

In the embodiments of the present application, an IS-IS protocol, considering device compatibility, adds a Slice Adj-SID sub-TLV format and a Slice LAN Adj-SID format based on the Adj-ID notification mode of the Slice-ID. As shown in FIG. 8 and FIG. 9, two new sub-TLVs are added to achieve the notification of the Slice-ID field information which is used to identify the Slice-ID information corresponding to the Adj-SID.

In the embodiments of the present application, an IS-IS protocol, considering device compatibility, adds a Slice L2 Bundle Member Adj-SID sub-TLV format and a Slice L2 Bundle Member LAN Adj-SID format based on the L2 Bundle Member Adj-ID notification mode of the Slice-ID. The formats are basically the same as shown in FIG. 8 and FIG. 9. Two new sub-TLVs are added to achieve the notification of the Slice-ID field information which is used to identify the Slice-ID information corresponding to the Adj-SID.

Figure 10:
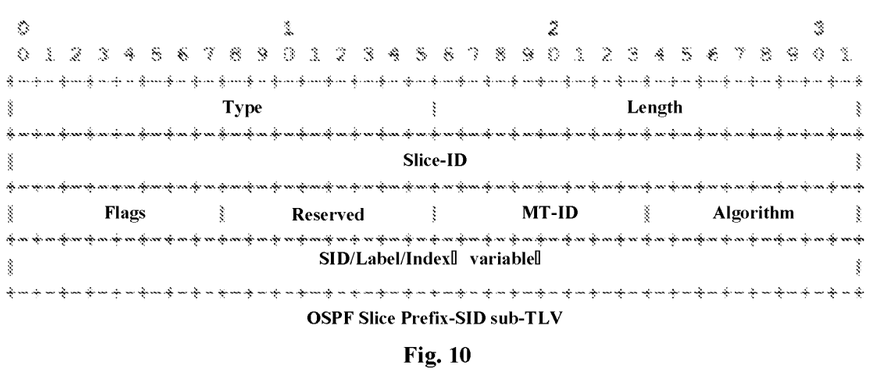
FIG. 10 is a format diagram of Prefix SID sub-TLV carrying Slice-ID information in an Open Shortest Path First (OSPF) protocol according to an exemplary embodiment of the present application.

In the embodiments of the present application, an OSPF protocol, considering device compatibility, adds the Slice Prefix-SID sub-TLV format based on the Prefix-ID notification mode of the Slice-ID. As shown in FIG. 10, the new Prefix-SID sub-TLV is added to achieve the notification of the Slice-ID field information which is used to identify the Slice-ID information corresponding to the Prefix-SID.

Figure 11:
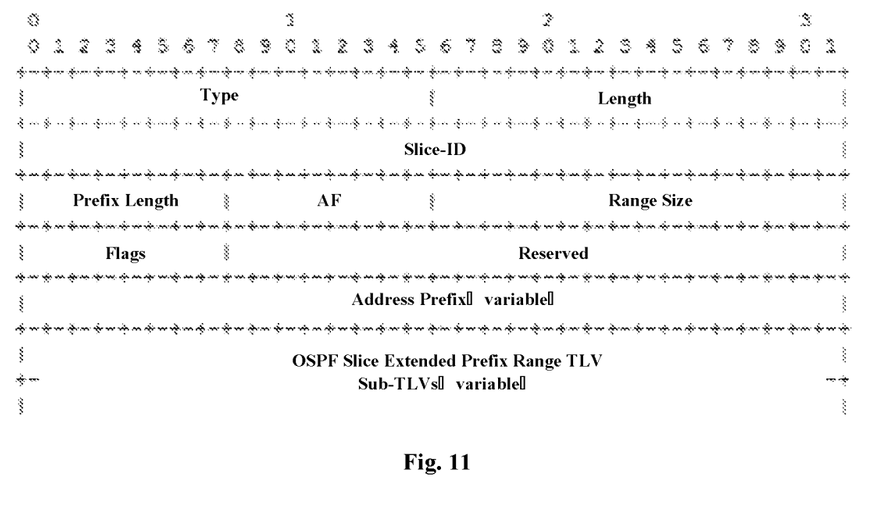
FIG. 11 is a format diagram of Extended Prefix Range TLV carrying Slice-ID information in an OSPF protocol according to an exemplary embodiment of the present application.

In the embodiments of the present application, an OSPF protocol, considering device compatibility, adds a Slice Extended Prefix Range TLV format based on a Slice-ID notification Extended Prefix Range information mode. As shown in FIG. 11, compared with the Extended Prefix Range TLV defined by the IETF, the Slice Extended Prefix Range TLV is added to achieve the notification of the Slice-ID field which is used to identify the Slice-ID information corresponding to the Prefix-SID of the notification.

Figure 12:
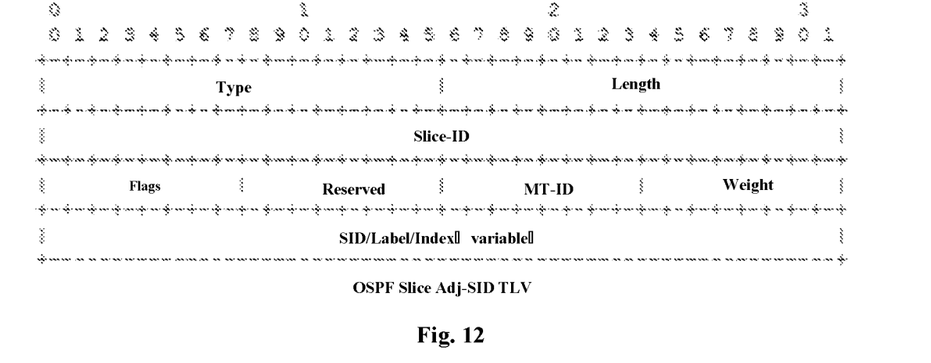
FIG. 12 is a format diagram of Adj-SID sub-TLV carrying Slice-ID information in an OSPF protocol according to an exemplary embodiment of the present application.
Figure 13:
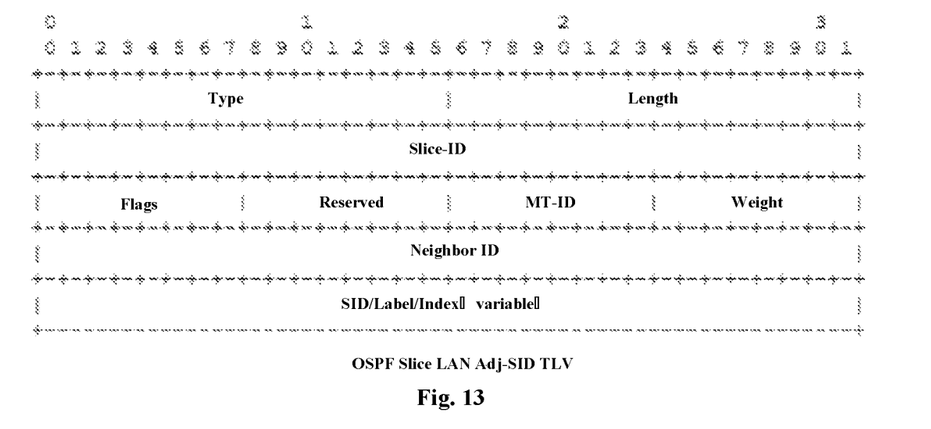
FIG. 13 is a format diagram of LAN Adj-SID sub-TLV carrying Slice-ID information in an OSPF protocol according to an exemplary embodiment of the present application.

In the embodiments of the present application, an OSPF protocol, considering device compatibility, adds the Slice Adj-SID sub-TLV format and the Slice LAN Adj-SID format based on the Adj-ID notification mode of the Slice-ID.

As shown in FIG. 12 and FIG. 13, two new sub-TLVs are added to achieve the notification of the Slice-ID field information which is used to identify the Slice-ID information corresponding to the Adj-SID.

Figure 2:
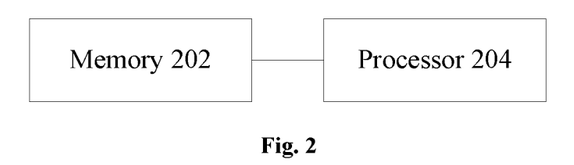
FIG. 2 is a structure diagram of a network device according to an embodiment of the present application.

The embodiments of the present application also provide a network device. FIG. 2 is a structure diagram of a network device according to an embodiment of the present application. As shown in FIG. 2, the network device includes a memory 202 and a processor 204. The memory stores a computer program. The processor is configured to run the computer program to perform the following operations. A forwarding path for service data is determined according to network resource configuration information of a designated network and a network slice of the service data, wherein the network resource configuration information indicates one or more network slices associated with one or more network resources of the designated network, and a network slice associated with a network resource of the determined forwarding path matches the network slice of the service data. The service data is forwarded according to the forwarding path.

Through the embodiments of the present application, the forwarding path for the service data can be determined according to the network resource configuration information of the designated network and the network slice of the service data, wherein the network resource configuration information indicates one or more network slices associated with one or more network resources of the designated network, and a network slice associated with a network resource of the determined forwarding path matches the network slice of the service data; and the service data is forwarded according to the forwarding path. Therefore, the problem in the related art that network slice service data cannot be forwarded in a bearer network can be solved, and different pieces of service data can be forwarded according to their corresponding network slice resources.

It is to be noted that the memory 202 may be configured to store a computer program, for example, a software program of application software and a module, for example, a computer program corresponding to the method for forwarding the service data in the present application. The processor 204 runs the computer program stored in the memory 202, thereby executing various functional applications and data processing, namely implementing the above-mentioned method. The memory 202 may include a high-speed random access memory and may also include a nonvolatile memory, for example, one or more magnetic storage devices, flash memories or other nonvolatile solid-state memories.

In an implementation mode, the operation that the network device determines the forwarding path for the service data according to the network resource configuration information of the designated network and the network slice of the service data may include the following operation. The forwarding path for the service data is determined according to link resource configuration information. The network slice associated with each link on the determined forwarding path is the same as the network slice of the service data. The network resource configuration information includes the link resource configuration information. The link resource configuration information indicates one or more network slices associated with one or more links in the designated network.

In an implementation mode, the operation that the network device determines the forwarding path for the service data according to the link resource configuration information may further include the following operation. The next hop link of the service data is determined according to the link resource configuration information; or, the forwarding path for forwarding the service data to the destination node is determined according to the link resource configuration information based on a preset algorithm. The forwarding path includes multiple links.

In an implementation mode, the operation that the network device determines the forwarding path for the service data according to the network resource configuration information of the designated network and the network slice of the service data may include the following operation. The member interface of the link for forwarding the service data on the forwarding path is determined according to link member interface configuration information. A network slice associated with the member interface of the link for forwarding the service data is the same as the network slice of the service data. The link resource configuration information includes the link member interface configuration information. The link member interface configuration information indicates one or more network slices associated with one or more member interfaces of one or more links in the designated network.

In an implementation mode, the operation that the network device determines the forwarding path for the service data according to the network resource configuration information of the designated network and the network slice of the service data may further include the following operation. The forwarding path for the service data is determined according to network node resource configuration information. A network slice associated with each network node on the determined forwarding path is the same as the network slice of the service data. The network resource configuration information includes the network node configuration information. The network node configuration information indicates one or more network slices associated with one or more network nodes in the designated network.

In an implementation mode, the operation that the network device forwards the service data according to the forwarding path may include the following operations. Information of the forwarding path is encapsulated on the service data. The service data is forwarded according to the encapsulated information of the forwarding path. In an implementation mode, before the forwarding path for the service data is determined according to the network resource configuration information of the designated network and the network slice of the service data, the method may include the following operations. The network resource configuration information is received. The network resource configuration information is notified to the network node in the designated network.

In an implementation mode, the network resource configuration information includes one or more network slice identities associated with one or more network resources of the designated network.

An embodiment of the present application also provides a network system, which includes any above network device.

An embodiment of the present application also provides a storage medium. The storage medium stores a computer program. The computer program is configured to perform operations in any of the above method embodiments at runtime.

In the present embodiment, the storage media may include, but not limited to, a USB flash disk, an ROM, an RAM, a mobile hard disk, a magnetic disk, a compact disc, and other media capable of storing the computer program.

It is apparent that a person skilled in the art shall understand that all of the above-mentioned modules or operations in the present disclosure may be implemented by using a general computation apparatus, may be centralized on a single computation apparatus or may be distributed on a network composed of multiple computation apparatuses. Optionally, they may be implemented by using executable program codes of the computation apparatuses. Thus, they may be stored in a storage apparatus and executed by the computation apparatuses, the shown or described operations may be executed in a sequence different from this sequence under certain conditions, or they are manufactured into each integrated circuit module respectively, or multiple modules or operations therein are manufactured into a single integrated circuit module. Thus, the embodiments of the present disclosure are not limited to any specific hardware and software combination.

The above is only the exemplary embodiments of the present disclosure, not intended to limit the present disclosure. As will occur to those having ordinary skill in the art, the present disclosure is susceptible to various modifications and changes. Any modifications, equivalent replacements, improvements and the like made within the principle of the present disclosure shall fall within the scope of protection of the present disclosure.

INDUSTRIAL APPLICABILITY

In the embodiments of the present application, the network device can determine the forwarding path for the service data according to the network resource configuration information of the designated network and the network slice of the service data, wherein the network resource configuration information indicates one or more network slices associated with one or more network resources of the designated network, and a network slice associated with a network resource of the determined forwarding path matches the network slice of the service data; and the network device forwards the service data according to the forwarding path. Therefore, the problem in the related art that network slice service data cannot be forwarded in a bearer network can be solved, and different pieces of service data can be forwarded according to their corresponding network slice resources.

What is claimed is:

1. A method for forwarding service data in a designated network, the method comprising:
   determining, by a network device, a forwarding path for the service data according to network resource configuration information of the designated network and a network slice of the service data, wherein the network resource configuration information indicates one or more network slices associated with one or more network resources in the designated network, and a network slice associated with a network resource of the determined forwarding path matches the network slice of the service data; and
   forwarding, by the network device, the service data according to the forwarding path;
   wherein determining, by the network device, the forwarding path for the service data according to the network resource configuration information of the designated network and the network slice of the service data comprises:
   determining, by the network device, the forwarding path for the service data according to link resource configuration information, wherein the network slice associated with each link on the determined forwarding path is the same as the network slice of the service data, the network resource configuration information comprises the link resource configuration information, and the link resource configuration information indicates one or more network slices associated with one or more links in the designated network;
   wherein determining, by the network device, the forwarding path for the service data according to the network resource configuration information of the designated network and the network slice of the service data further comprises:
   determining, by the network device, a member interface of the link for forwarding the service data on the forwarding path according to link member interface configuration information, wherein a network slice associated with the member interface of the link for forwarding the service data is the same as the network slice of the service data, the link resource configuration information comprises the link member interface configuration information, and the link member interface configuration information indicates one or more network slices associated with one or more member interfaces of one or more links in the designated network.

2. The method as claimed in claim 1, wherein determining, by the network device, the forwarding path for the service data according to the link resource configuration information comprises:
   determining, by the network device, a next hop link of the service data according to the link resource configuration information; or,
   determining, by the network device according to the link resource configuration information based on a preset algorithm, the forwarding path for forwarding the service data to a destination node, wherein the forwarding path comprises multiple links.

3. The method as claimed in claim 1, wherein determining, by the network device, the forwarding path for the service data according to the network resource configuration information of the designated network and the network slice of the service data further comprises:
   determining, by the network device, the forwarding path for the service data according to network node configuration information, wherein a network slice associated with each network node on the determined forwarding path is the same as the network slice of the service data, the network resource configuration information comprises the network node configuration information, and the network node configuration information indicates one or more network slices associated with one or more network nodes in the designated network.

4. The method as claimed in claim 1, wherein forwarding, by the network device, the service data according to the forwarding path comprises:
   encapsulating, by the network device, information of the forwarding path on the service data, and forwarding, by the network device, the service data according to the encapsulated information of the forwarding path.

5. The method as claimed in claim 1, wherein before determining, by the network device, the forwarding path for the service data according to the network resource configuration information of the designated network and the network slice of the service data, the method comprises:
   receiving, by the network device, the network resource configuration information, wherein the network resource configuration information is notified to the network node in the designated network.

6. The method as claimed in claim 1, wherein the network resource configuration information comprises one or more network slice identities associated with one or more network resources of the designated network.

7. A network device, comprising a memory and a processor, wherein the memory stores a computer program, and the processor is configured to run the computer program to:
 determine a forwarding path for the service data according to network resource configuration information of a designated network and a network slice of the service data, wherein the network resource configuration information indicates one or more network slices associated with one or more network resources in the designated network, and a network slice associated with a network resource of the determined forwarding path matches the network slice of the service data; and
 forward the service data according to the forwarding path;
 wherein the processor, when configured to run the computer program to determine the forwarding path for the service data according to the network resource configuration information of the designated network and the network slice of the service data, is configured to:
 determine the forwarding path for the service data according to link resource configuration information, wherein the network slice associated with each link on the determined forwarding path is the same as the network slice of the service data, the network resource configuration information comprises the link resource configuration information, and the link resource configuration information indicates one or more network slices associated with one or more links in the designated network;
 wherein the processor, when configured to run the computer program to determine the forwarding path for the service data according to the network resource configuration information of the designated network and the network slice of the service data, is configured to:
 determine a member interface of the link for forwarding the service data on the forwarding path according to link member interface configuration information, wherein a network slice associated with the member interface of the link for forwarding the service data is the same as the network slice of the service data, the link resource configuration information comprises the link member interface configuration information, and the link member interface configuration information indicates one or more network slices associated with one or more member interfaces of one or more links in the designated network.

8. The network device as claimed in claim 7, wherein the processor, when configured to run the computer program to determine the forwarding path for the service data according to the link resource configuration information, is further configured to:
 determine a next hop link of the service data according to the link resource configuration information; or,
 determine, according to the link resource configuration information based on a preset algorithm, the forwarding path for forwarding the service data to a destination node, wherein the forwarding path comprises multiple links.

9. The network device as claimed in claim 7, wherein the processor, when configured to run the computer program to determine the forwarding path for the service data according to the network resource configuration information of the designated network and the network slice of the service data, is further configured to:
 determine the forwarding path for the service data according to network node configuration information, wherein a network slice associated with each network node on the determined forwarding path is the same as the network slice of the service data, the network resource configuration information comprises the network node configuration information, and the network node configuration information indicates one or more network slices associated with one or more network nodes in the designated network.

10. A network system, comprising the network device as claimed in claim 9.

11. The network device as claimed in claim 7, wherein the processor, when configured to run the computer program to forward the service data according to the forwarding path, is configured to:
 encapsulate information of the forwarding path on the service data, and forward the service data according to the encapsulated information of the forwarding path.

12. A network system, comprising the network device as claimed in claim 7.

13. A non-transitory computer-readable storage medium, storing a computer program, wherein the computer program, when being run by a processor, is configured to cause the processor to:
 determine a forwarding path for the service data according to network resource configuration information of a designated network and a network slice of the service data, wherein the network resource configuration information indicates one or more network slices associated with one or more network resources in the designated network, and a network slice associated with a network resource of the determined forwarding path matches the network slice of the service data; and
 forward the service data according to the forwarding path;
 wherein the computer program is further configured to cause the processor to determine the forwarding path for the service data according to link resource configuration information, wherein the network slice associated with each link on the determined forwarding path is the same as the network slice of the service data, the network resource configuration information comprises the link resource configuration information, and the link resource configuration information indicates one or more network slices associated with one or more links in the designated network;
 wherein the computer program is further configured to cause the processor to determine a member interface of the link for forwarding the service data on the forwarding path according to link member interface configuration information, wherein a network slice associated with the member interface of the link for forwarding the service data is the same as the network slice of the service data, the link resource configuration information comprises the link member interface configuration information, and the link member interface configuration information indicates one or more network slices associated with one or more member interfaces of one or more links in the designated network.

14. A network system, comprising the network device as claimed in claim 8.

* * * * *